(12) United States Patent
Blackwell

(10) Patent No.: US 8,079,560 B2
(45) Date of Patent: Dec. 20, 2011

(54) ADJUSTABLE MOUNTING APPARATUS FOR ELECTRICAL DEVICES

(75) Inventor: Donald A. Blackwell, Saratoga, CA (US)

(73) Assignee: Donald A. Blackwell, Saratoga, CA (US)

(*) Notice: Subject to any disclaimer, the term of this patent is extended or adjusted under 35 U.S.C. 154(b) by 222 days.

(21) Appl. No.: 12/567,784

(22) Filed: Sep. 27, 2009

(65) Prior Publication Data

US 2011/0073728 A1 Mar. 31, 2011

(51) Int. Cl.
*A47B 96/06* (2006.01)

(52) U.S. Cl. ............... 248/229.1; 248/229.17; 403/385; 403/53; 24/329; 24/335

(58) Field of Classification Search ............... 248/229.1, 248/229.23, 291.1, 230.1, 292.12, 49, 62, 248/67.7, 68.1, 70, 4.1, 74.3, 74.4, 313, 316.1; 403/53, 385, 388, 164; 24/336, 339, 340, 24/341, 335, 329
See application file for complete search history.

(56) References Cited

U.S. PATENT DOCUMENTS

| 555,183 | A | * | 2/1896 | Rhind | 248/553 |
| 970,751 | A | * | 9/1910 | Pranke | 248/515 |
| 1,706,801 | A | * | 3/1929 | Merrill | 403/385 |
| 2,876,027 | A | * | 3/1959 | Sulmonetti | 403/53 |
| 3,495,857 | A | * | 2/1970 | Hawke et al. | 403/57 |
| 3,747,166 | A | * | 7/1973 | Eross | 248/75 |
| 4,071,217 | A | | 1/1978 | Kongelka | 248/309.1 |
| 4,878,642 | A | * | 11/1989 | Kirby, Jr. | 248/311.2 |
| 5,167,466 | A | * | 12/1992 | Hsieh | 403/385 |
| 5,259,690 | A | * | 11/1993 | Legge | 403/385 |
| 5,443,232 | A | * | 8/1995 | Kesinger et al. | 248/62 |
| 5,669,536 | A | * | 9/1997 | Wang | 224/443 |
| 5,704,232 | A | * | 1/1998 | Kuo | 70/233 |
| 5,816,736 | A | * | 10/1998 | Kroulik | 403/389 |
| 6,095,386 | A | * | 8/2000 | Kuo | 224/448 |
| 6,315,250 | B1 | * | 11/2001 | Meyer | 248/74.1 |
| 6,719,255 | B2 | * | 4/2004 | Chen | 248/323 |
| 6,802,633 | B1 | * | 10/2004 | VandenBossche | 362/477 |
| 7,241,071 | B2 | * | 7/2007 | Carraher et al. | 403/164 |
| 7,311,233 | B2 | * | 12/2007 | Chen | 224/425 |
| 2006/0178028 | A1 | | 8/2006 | Swiatek et al. | |
| 2007/0022574 | A1 | * | 2/2007 | Belisle et al. | 24/19 |

* cited by examiner

Primary Examiner — Kimberly Wood

(57) ABSTRACT

Adjustable mounting apparatus for securing electrical connectors and equipment to powersports vehicles such as motorcycles, all terrain vehicles and snowmobiles. These mounting brackets are low cost, compact and lightweight. The brackets install easily without the use of fasteners and are adjustable without the use of tools or modification allowing them to conform to surfaces that may be flat, curved or fully round.

6 Claims, 5 Drawing Sheets

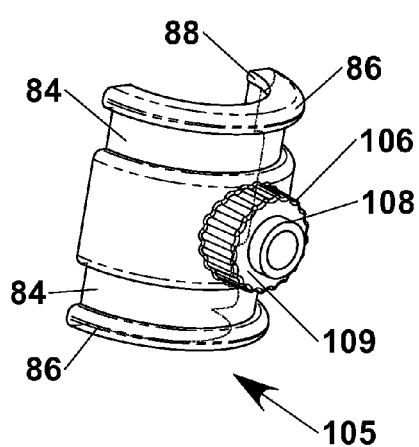
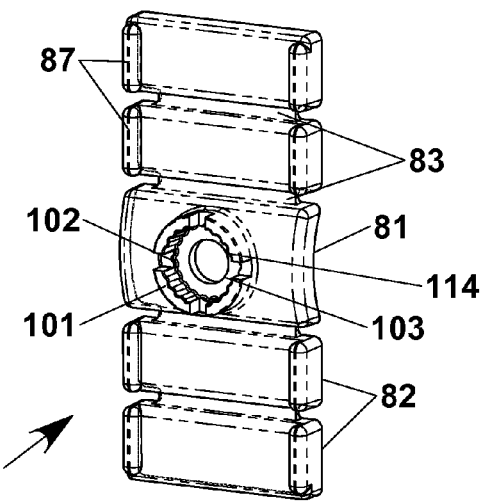
Fig. 3a
Fig. 3b
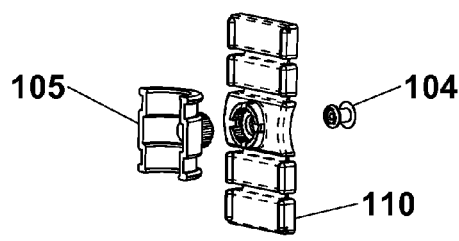
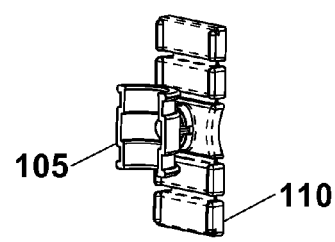
Fig. 4a
Fig. 4b
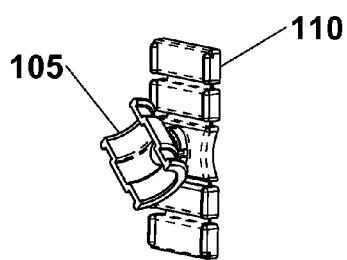
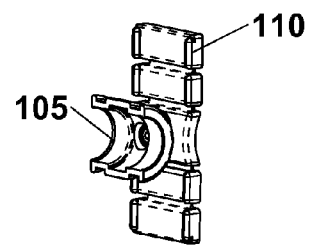
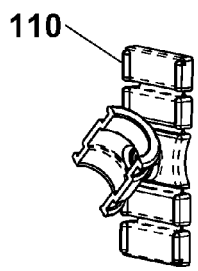
Fig. 4c
Fig. 4d
Fig. 4e

ADJUSTABLE MOUNTING APPARATUS FOR ELECTRICAL DEVICES

FIELD OF INVENTION

This invention relates to electrical component mounting methods for motorcycles, all terrain vehicles, snowmobiles and other vehicle commonly referred to as powersports vehicles and also but not limited to other special purpose vehicle such as golf carts and powered wheel chairs.

BACKGROUND OF INVENTION

Owners and users of motorcycles, all terrain vehicles, snowmobiles, commonly called powersports vehicles and other special purpose vehicles such as golf carts and powered wheel chairs are frequently modified from their original equipment manufactured configuration to add a variety of accessories that enhance the vehicle capability and the operator's experience. These added accessories may be roughly divided into three categories: low power up to 2 amp or 20 watts, medium power of 2 to 5 amps or 20 to 60 watts and high power of 6 amps or 80 watts and greater. Examples of low power accessories may include navigation systems such as global positioning systems, cell phones, entertainment systems, radar detectors, intra-vehicle rider to passenger communication systems, inter-vehicle short range communication systems, personal digital assistants and small computers. Medium power accessories may include on-road auxiliary lighting and single articles of heated clothing. High power devices may include high intensity off-road lighting, external battery chargers and multiple articles of heated clothing A search of available vehicle accessories shows that there exist many more types of low power accessories than medium or high power accessories. Moreover, low power accessories are commonly able to be easily removed from the vehicle for personal use. For example a cell phone is normally carried on the person but can be mounted in a quick detach cradle on a vehicle for hands-free use. High power accessories are more commonly attached more permanently on the vehicle. For example high power off road lights must be mounted rigidly to ensure proper beam aiming and require special purpose wiring capable of carrying high current.

In spite of the fact that most accessories fall into the low power category, the availability of compact low power connectors with convenient vehicle mounting methods with quick detach capability non-existent in the market.

The primary object of this invention is to provide the owners and users of powersports vehicles and specialty vehicles compact, lightweight, easy to install mounting methods that allow the utilization of compact low power connectors.

SUMMARY OF THE INVENTION

To achieve the above objectives, and in accordance with the purpose of the invention broadly described herein to provide simple mounting brackets for compact low power connectors that are easily adjustable to a variety of vehicle surfaces. The mounting brackets described herein comprising: a base member of generally flat surface with flexible members at either end that allow the device to conform to surfaces that may be flat, curved or fully round.

The mounting bracket may have either an integral part for securing a connector or a separate securing part that may be adjusted to provide optimized cable routing angles.

BRIEF DESCRIPTION OF THE DRAWINGS

FIG. 1a shows an embodiment of a mounting bracket for an electrical connector comprising a mounting plate and integral coaxial barrel jack support element. This view shows the bracket in a flat configuration for mounting on a flat surface.

FIG. 1b shows a view of the mounting side of said mounting bracket shown in FIG. 1a.

FIGS. 3a and 3b show an embodiment of an adjustable angle mounting bracket wherein the mounting plate and support for the coaxial barrel jack are constructed as separate parts joined by a single fastener. The two parts have mating male and female features with cylindrical indexing detent protuberances and cavities that allow the support part to be rotated to various angles for optimized electrical cable installation and routing.

FIGS. 4a and 4b show exploded and assembled views of the adjustable angle mounting bracket.

FIGS. 4c through 4e show the adjustable angle mounting bracket with the coaxial barrel support positioned at varying angles.

DETAILED DESCRIPTION OF THE INVENTION

Reference will now be made in detail to the present embodiments of the invention as illustrated in the accompanying figures.

Figures 1A, 1B:
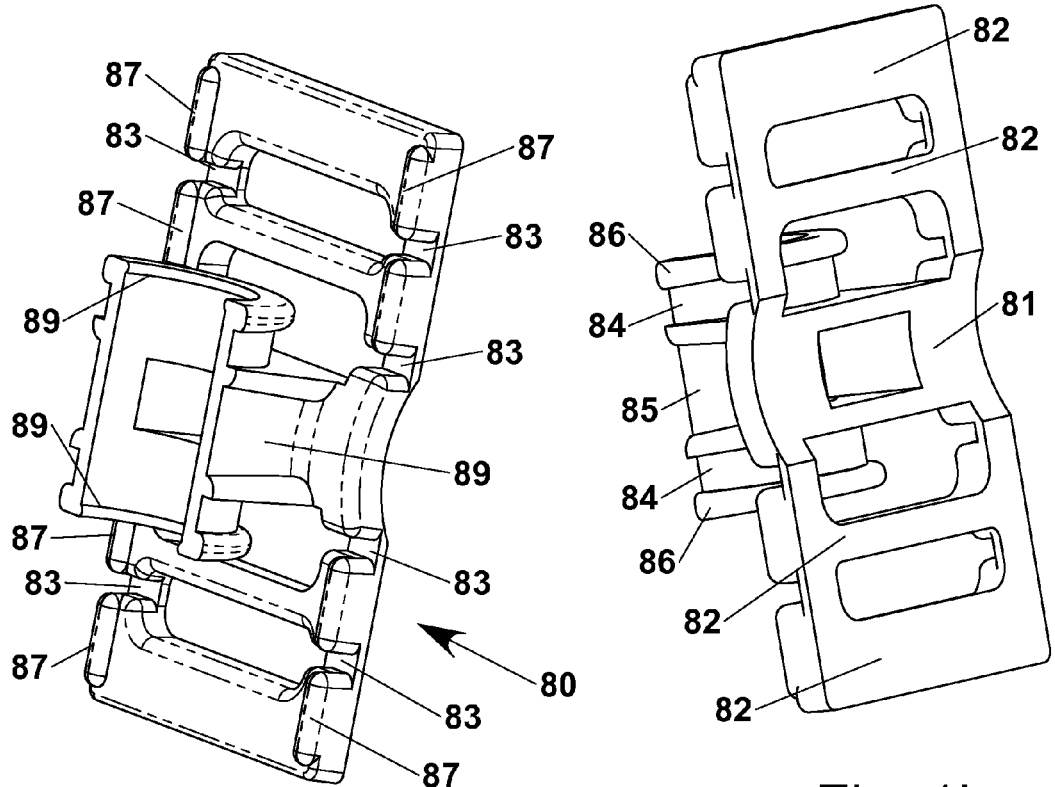

FIGS. 1a and 1b illustrates a mounting bracket 80 for mounting an electrical connector or other small device to a vehicle surface. Said mounting bracket 80 may be molded preferably from nylon due to its excellent flexural modulus and chemical resistance and good tensile strength; however other plastics and resilient materials such as synthetic rubber or thermoplastic elastomer (TPE) may be used.

FIG. 1a shows a saddle element 85 shaped as a truncated hollow cylinder formed to accept the body shape of an electrical connector 100. Again, shapes other than the truncated hollow cylinder could be utilized but are not optimum for the application. Said saddle element 85 includes two radial fixing grooves 84, each located externally at the extreme ends of the cylinder. Said radial fixing grooves 84 form a natural fixing ridge 86 at the extreme ends of the saddle element 85. Said fixing ridges 86 and radial fixing grooves 84 locate mounting parts as will be described in following paragraphs. The embodiment shown in FIG. 1a also includes two small locating ribs 88 that are radially located around the extreme ends of the cylinder that enhance the longitudinal location of an installed electrical connector 100. A mounting stalk 89 joins the saddle element 85 to a central mounting element 81.

Said central mounting element 81 is curved across its axial direction at a radius that fits a common vehicle handle bar or frame tube. The short longitudinal length of said central mounting element 81 insures that the height of the chord of said central mounting element 81 will fit close enough to a flat surface to provide support.

Attached to, and integrally molded with this central mounting element 81 are flat mounting surfaces 82 joined by flexible members 83 commonly called living hinges. The said flexible members 83 provide a bend plane that allow the flat mounting surface 82 to be bent over a curved surface as will be described in the following paragraph. Said flat mounting surface 82 and flexible members 83 are mirrored about the axis of central mounting element 81 to give a total of four flexible elements much like a chain. This configuration of four flexible members 83 appears to be the optimum for flexibility for the overall part size, however any configuration with two or more flexible members 83 are possible. Small rounded linear fixing ribs 87 are located at the edges of each flexible member 83 to assist locating a mounting part as will be described in following paragraphs.

Figure 2:
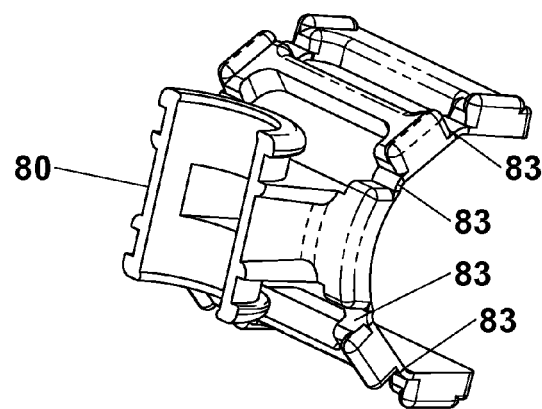
FIG. 2 shows the mounting bracket of FIG. 1 configured to fit a rounded surface buy bending the integral hinge elements.

FIG. 2 shows the mounting bracket 80 bent at its flexible members 83 to form a circular shape. It follows that by bending the flexible members 83 of the mounting bracket 80 at different angles just about any surface shape can be accommodated from flat to gently curved such as a fuel tank or fairing, to a circle so tight as to cause the ends of the flat mounting surface 82 to touch.

FIGS. 3a and 3b show a two part mounting bracket that serves the same purpose as mounting bracket 80 but with an added feature that allows the encapsulated barrel jack to be aligned in multiple positions for enhanced cable routing.

FIG. 3a illustrates the barrel support 105 that includes the saddle element 85, fixing ridge 86, two radial fixing grooves 84, two locating ribs 88 that combine to provide support for an electrical connector 100. In place of the mounting plate parts, the barrel support 105 includes an axial pivot boss 109 preferably integrally molded to the barrel support 105 that protrudes from the convex side of said barrel support 105. Said axial pivot boss includes an indexing element 106, shown in this embodiment as a multi-sided star with rounded points. This embodiment is but one of many configurations with as few as four and as many as ten or more points that may be utilized to accomplish the indexing functions. As can be readily seen, the more points included in the configuration the finer the indexing angle possible. Said pivot boss includes a locating boss 108 that serves both as centering device and also as a hard stop for the mated parts that prevents the fastener from exerting excessive clamping force and thus preventing the rotation of the two parts with respect to each other. A central hole 107 with used for securing the barrel support 105 to its mating part which is further described in the following paragraphs.

FIG. 3b illustrates a support plate 110 that includes the central mounting element 81, flat mounting surfaces 82, and flexible members 83. Said support plate 110 includes an axial pivot cavity 101 preferably molded integrally on the convex side of the support plate 110. Said axial pivot cavity 101 includes a cavity indexing element 102 shown in this embodiment as a multi-pointed star with rounded points so as to mate with the indexing element 106 of the barrel support 105. Four spring slots 114 allow the walls of the axial pivot cavity 101 to distort outward when the barrel support 105 is rotated and thus acting like detent springs. Said axial pivot cavity 101 includes a central plate mounting hole 103 used for securing the support plate 110 to the barrel support 105.

FIG. 4a shows and exploded view of barrel support 105 and support plate 110 affixed with rivet 104.

FIGS. 4b, 4c, 4d, and 4e show the barrel support 105 and support plate 110 assembled in four of the many positions possible with the indexing features 102 and 106.

Figure 5A:
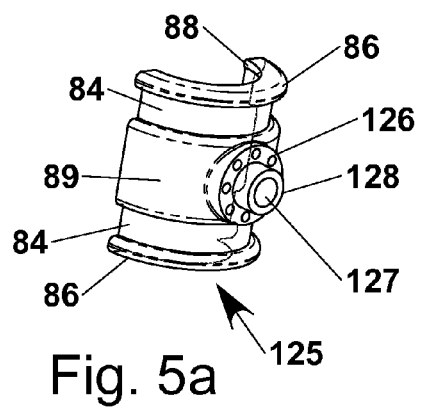
FIGS. 5a and 5b show a variation of the adjustable angle mounting bracket wherein the adjustment detents are radial concave and convex features rather than cylindrical.

FIG. 5a shows a barrel mount 125 of an embodiment of an adjustable mounting bracket includes the common bracket elements: saddle element 85, fixing ridge 86, two radial fixing grooves 84, two locating ribs 88 that combine to provide support for an electrical connector 100. In place of the mounting plate parts, the barrel support 125 includes a radial pivot boss 129 preferably integrally molded to the barrel support 125 that protrudes from the convex side of said barrel support 125. Said radial pivot boss includes a plurality of indexing dots 126, shown in this embodiment as radially positioned convex protrusions. Said radial pivot boss includes a radial locating boss 128 that serves both as centering device and also as a hard stop for the mated parts that prevents the fastener from exerting excessive clamping force and thus preventing the rotation of the two parts with respect to each other. A radial boss central hole 127 used for securing the barrel support 125 to its mating part which is further described in the following paragraphs.

Figure 5B:
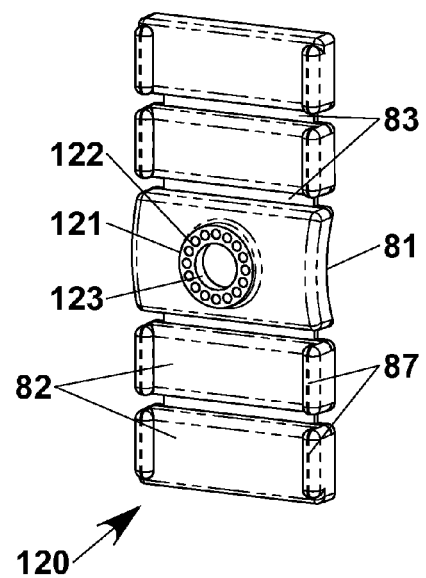

FIG. 5b illustrates a radial indexing support plate 120 that includes the central mounting element 81, flat mounting surface 82, and flexible members 83. Said radial indexing support plate 120 includes a radial pivot surface 121 preferably molded integrally on the convex side of the radial indexing support plate 120. Said radial pivot surface 121 includes a plurality of recessed indexing cavities 122 shown in this embodiment as concave depressions so as to mate with the indexing dots 126 of the barrel support 125. Inherent flexibility of the plastic parts allows the barrel support 105 to rotate with respect to the radial indexing support plate 120. Said radial pivot surface 121 includes an indexing support plate central hole 123 used for securing the radial indexing support plate 120 to the barrel support 125.

Figure 6:
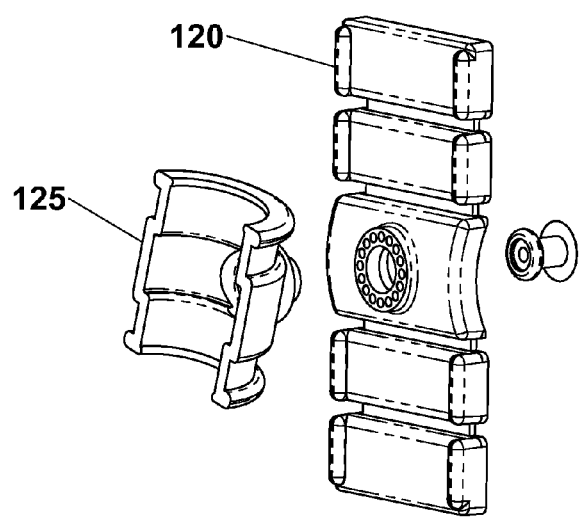
FIG. 6 shows an exploded view of the adjustable angle mounting bracket described in FIGS. 5a and 5b.

FIG. 6 shows an exploded view of the adjustable mounting bracket including the radial indexing support plate 120, barrel mount 125 and fastening rivet 104.

Figure 7:
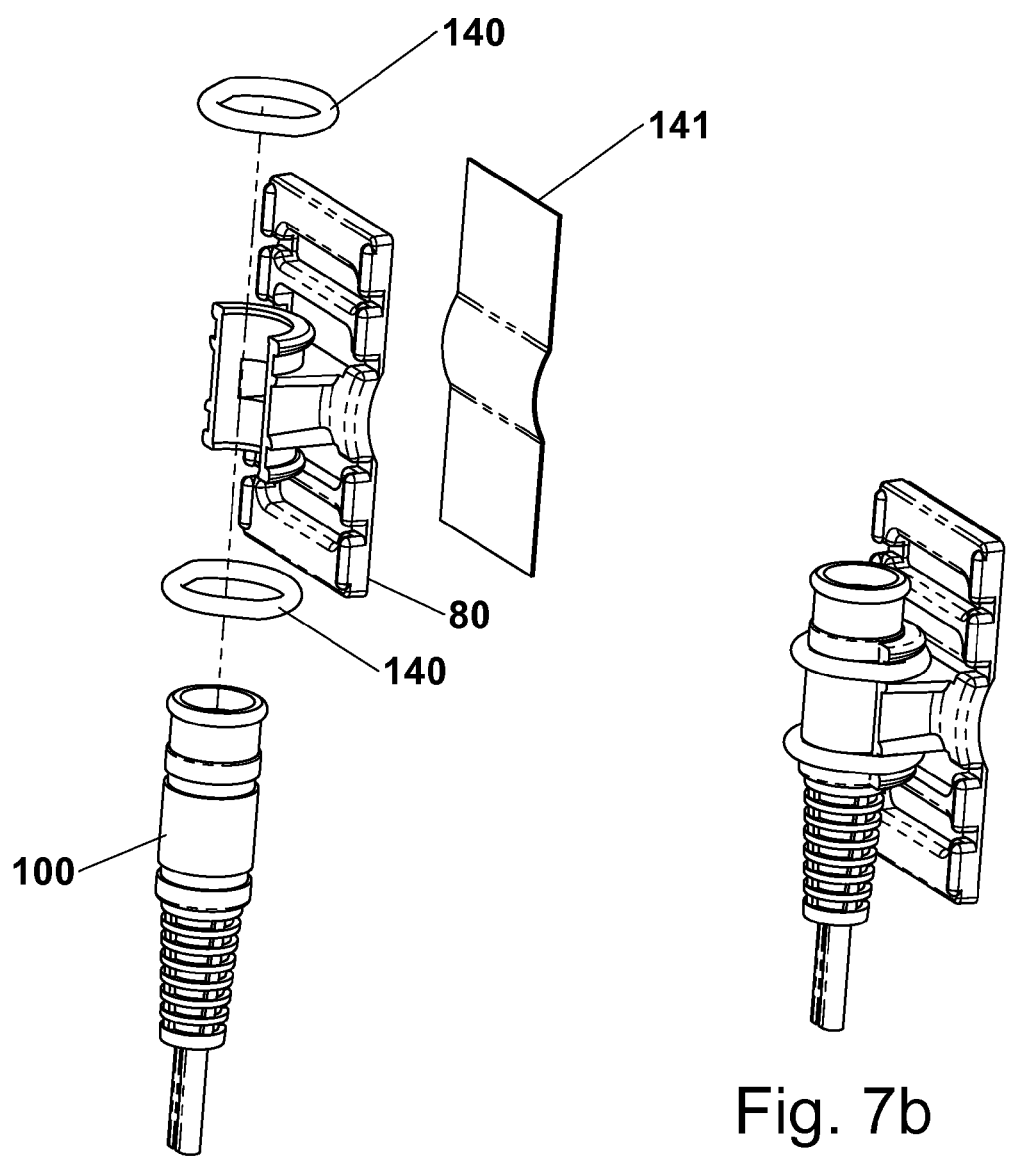
FIGS. 7a and 7b illustrate exploded and assembled views of an electrical connector fixed to the mounting bracket using two o-rings.

FIG. 7a shows and exploded view of one embodiment of the parts that make up a mounted electrical connector 100. As is shown in this embodiment, the assembly may be secured by two o-rings 140.

FIG. 7b shows the assembled view of the above embodiment. This view shows how the radial fixing grooves 84 of the saddle element 85 along with the radial grooves 12 of an electrical connector 100 securely capture the o-rings 140 preventing movement of the electrical connector 100 with respect to the mounting bracket 80.

Figure 8:
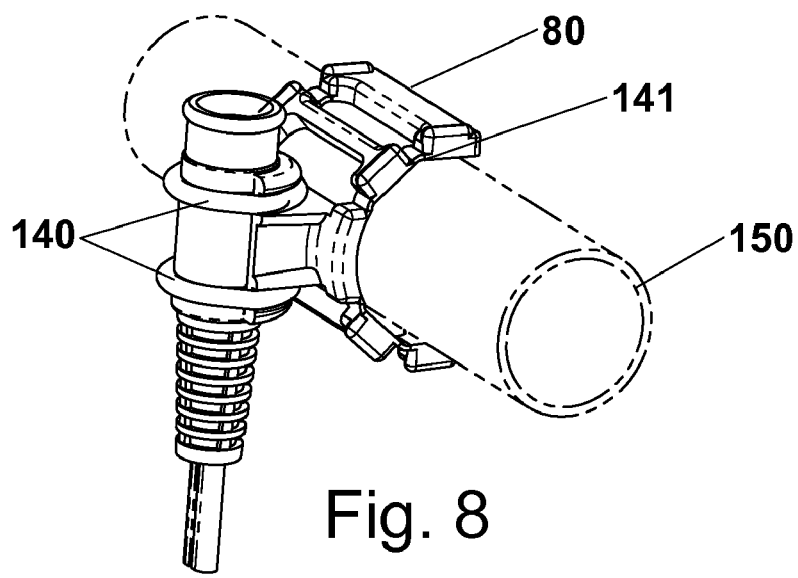
FIG. 8 illustrates a typical mounting arrangement on a vehicle, in this case on a round tube such as a handle bar, highway bar or frame tube. The arrangement shown utilizes o-rings to attach the electrical connector to the mounting bracket and high strength double stick tape to secure the assembly to the vehicle.

FIG. 8 shows the assembly described in FIGS. 7a and 7b as installed on a non-flat surface. In this case the assembly is mounted on a tube 150 which might be a motorcycle handle bar, a frame tube, roll bar or a body strut. All of the elements of the assembly are the same as those used on a flat surface; an electrical connector 100 and mounting bracket 80 secured with two o-rings 140. High performance double stick acrylic tape 141 secures the complete assembly to the vehicle.

Figure 9:
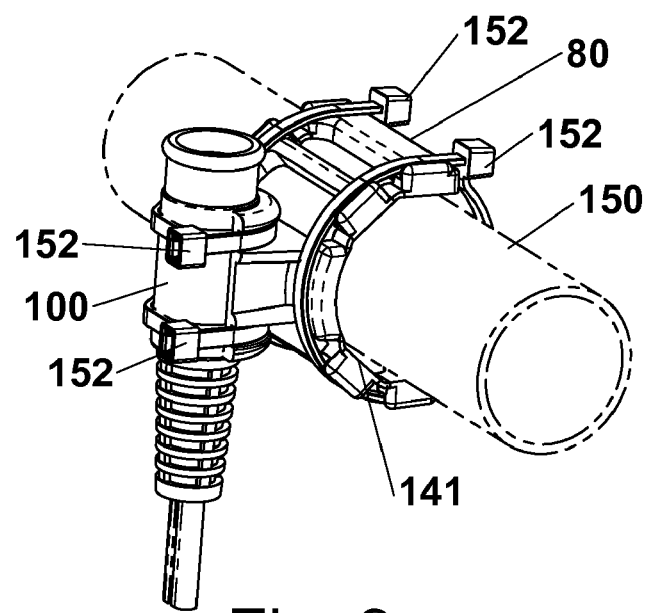
FIG. 9 shows an alternate mounting arrangement where the electrical connector is fixed to the mounting bracket with tie wraps and the mounting bracket fixed to the vehicle with high strength double stick tape and tie wraps. This highly robust mounting arrangement would be advantageous in severe service such as off-road vehicles and ATVs where the assembly might get struck by brush, rocks or other debris.

FIG. 9 shows a more robust assembly embodiment wherein the o-rings 140 are replaced by tie-wraps 152 and the high performance double stick acrylic tape 141 is supplemented by tie-wraps 152. This robust installation would be applicable in harsh duty environments such as off-road vehicles where the assembly might be subjected to strikes from brush and rocks and in the case of a vehicle upset, the earth or packed snow.

It is evident from the above description that a wide variety of connector mounting configurations may be fashioned from the present invention. Different adjustable mounting brackets may be constructed in a variety of shapes using different materials to meet the needs of differing connector types and vehicle fitments. Accordingly, additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A multi-adjustable mounting bracket comprising
a separable and rotatable saddle element comprising a mounting saddle having an integrally formed pivot boss including detents and a centrally located fastener hole; and
a separable flexible mounting element rotatably secured to the saddle element comprising a centrally located mounting base and at least three integrally hinged members, an integrally formed pivot socket including a plurality of resilient detent springs having a central mounting hole; and
the saddle element is rotatably secured to said flexible mounting element by means of a rivet extending through said centrally located fastener hole o the pivot boss and said central hole of said pivot socket; and
wherein said pivot boss can rotate relative to said pivot socket by allowing the plurality of resilient detents springs to distort outward when the pivot boss is rotated; and
wherein said separable flexible mounting element allows said mounting bracket to be adjusted to conform to a variety of shapes including flat, round, or curved surfaces.

2. The multi-adjustable mounting bracket of claim 1 wherein said saddle element may include a combination of raised rib elements and grooves in order to provide enhanced locating capability.

3. The multi-adjustable mounting bracket of claim 1 wherein the components are comprised of a resilient plastic.

4. The multi-adjustable mounting bracket of claim 1 wherein the components are comprised of synthetic rubber.

5. The multi-adjustable mounting bracket of claim 1 wherein the components are comprised of a malleable metal.

6. The multi-adjustable mounting bracket of claim 1 wherein the components are comprised of composite.

* * * * *